(12) United States Patent
Anderson

(10) Patent No.: US 10,284,327 B1
(45) Date of Patent: *May 7, 2019

(54) SPECIAL ENERGY SENSING ESPIONAGE DETECTOR

(71) Applicant: Gene W. Anderson, Escondido, CA (US)

(72) Inventor: Gene W. Anderson, Escondido, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/005,442

(22) Filed: Jun. 11, 2018

Related U.S. Application Data

(63) Continuation of application No. 14/743,250, filed on Jun. 18, 2015, now Pat. No. 9,998,256.

(60) Provisional application No. 62/117,412, filed on Feb. 17, 2015.

(51) Int. Cl.
*H04K 3/00* (2006.01)
*H04B 10/116* (2013.01)

(52) U.S. Cl.
CPC ........... *H04K 3/822* (2013.01); *H04B 10/116* (2013.01); *H04K 2203/14* (2013.01)

(58) Field of Classification Search
CPC .. H04K 3/822; H04K 2203/14; H04B 10/116; G06F 3/167
See application file for complete search history.

(56) References Cited

U.S. PATENT DOCUMENTS

| | | | | |
|---|---|---|---|---|
| 4,684,248 A | * | 8/1987 | Cinzori | G01B 11/272 356/141.3 |
| 9,998,256 B2 | * | 6/2018 | Anderson | H04K 3/822 |
| 2015/0104185 A1 | * | 4/2015 | Breuer | G01C 3/08 398/131 |

* cited by examiner

*Primary Examiner* — Leslie C Pascal
(74) *Attorney, Agent, or Firm* — Mintz Levin Cohn Ferris Glovsky and Popeo, P.C.

(57) ABSTRACT

An energy sensing espionage detector is disclosed. The detector is designed to alert on compromised LED lighting sources used by spies on unsuspecting corporations and individuals. The detector counters one threat vector that is emerging from newly mandated energy policies to replace conventional lighting with energy efficient LED lighting. The detector senses that information is being transmitted by the light source using pulsed or modulated energy that is not detectable by the human eye.

20 Claims, 6 Drawing Sheets

SPECIAL ENERGY SENSING ESPIONAGE DETECTOR

CROSS REFERENCE TO RELATED APPLICATIONS

The current application claims priority to U.S. Non-Provisional patent application Ser. No. 14/743,250, filed Jun. 18, 2015, which claims priority under 35 U.S.C. § 119(e) to U.S. Provisional patent application Ser. No. 62/117,412, filed on Feb. 17, 2015, the contents of which are hereby fully incorporated by reference.

The U.S. Government has issued a mandate to replace traditional lighting with energy efficient alternatives, such as light emitting diode (LED) lighting. See Pub. L. 110-140, EISA 2007 section 321, originally named the Clean Energy Act of 2007. However, solutions to meet this mandate have created new security exposures for agencies, organizations and consumers. These exposures are new, without compensating countermeasures. Some energy sources, such as an LED lightbulb, can be compromised, or "bugged," to carry information in a surreptitious manner. A compromised energy source will exhibit characteristics that are different from normal or unmodified sources. These characteristics are usually not detectable by a human's naked eye.

BACKGROUND

Visible light communication refers to short range optical wireless communication using the visible light spectrum from 380 to 780 nm. One example of visible light communication is varying the intensity of one or more light emitting diodes according to a modulation scheme. Another example is color-shift keying (CSK), which is a visible light communication technique enabled by recent advances in light emitting diode (LED) technology, and uses an intensity modulation scheme for two or more colors of LEDs. One type of CSK scheme is outlined in IEEE 802.15.7, in which data is transmitted through the variation of colors and/or intensity emitted by red, green, and blue LEDs. CSK communication is imperceptible to the human eye. IEEE 802.15.7 supports high-data-rate visible light communication up to 96 Mb/s by fast modulation of optical light sources which may be dimmed during their operation, and provides dimming adaptable mechanisms for flicker-free high-data-rate visible light communication.

In accordance with NIST Special Publication 800-53r4, Security and Privacy Controls for Federal Information Systems and Organizations, agencies are required to proactively search for: Information Leakage (section PE-19); Covert Channel Analysis (section SC-31); Out-of-band Channel (section SC-37); Insider Threat (section PM-12).

In short, SP800-53r4 is a guideline for organizations to perform due diligence and look for electronic exploitation or exfiltration of protected data or voice conversations. While this document establishes requirements only for United States Federal systems, there is a need for any agency, organization or consumer, in any part of the world, to establish protective measures against espionage and other forms of security breaches.

SUMMARY

This document describes a specially designed detector that can provide an alert if the detector is deployed proactively by an operator who is looking for modified sources, such as a compromised LED lighting source. A hand-held device is provided to provide agencies, organizations and consumers with an ability to confirm that replacement energy sources, such as replacement lighting, are performing within their prescribed operating ranges.

In one aspect, an apparatus for detecting a surreptitious signal from an energy emitting source includes a user interface. The user interface includes an input device to receive input from a user and an output device to output information to the user, the user interface providing an indication of a signal detection process that is activated based on the input to the input device. The signal detection process is configured to identify an energy pattern that is outside of specified performance boundaries of the energy emitting source, the energy pattern being undetectable by a human eye, and the information outputted by the output device includes a result of the signal detection process. The apparatus further includes a sensor to sense, upon activation of the signal detection process, whether or not the energy pattern from the energy emitting source is outside the specified performance boundaries of the energy emitting source. The apparatus further includes a processing unit connected with the sensor and the user interface, the processing unit having logic to execute the signal detection process and a processor to interpret and characterize the energy pattern sensed by the sensor. The processing unit is further configured to generate the result of the signal detection process for being output on the output device of the user interface.

In another aspect, a method of detecting a surreptitious signal from an energy emitting source includes the steps of receiving, by a processing unit, input from a user in an input device of a user interface, and activating, by the processing unit, a signal detection process based on the input to the input device. The signal detection process is configured to identify an energy pattern that is outside of specified performance boundaries of the energy emitting source, the energy pattern being undetectable by a human eye. The method further includes the step of sensing, by a sensor under control of the processing unit, whether or not the energy pattern from the energy emitting source is outside the specified performance boundaries of the energy emitting source. The method further includes a processor of the processing unit executing the steps of interpreting the energy pattern sensed from the energy emitting source, characterizing the interpreted energy pattern, and generating a result of the signal detection process based on the characterized energy pattern.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes a handheld and portable detector that can detect a modulating energy source, such as a compromised LED lighting source or other electronic device. If the detector detects an anomaly or modification, the detector will generate an alert. The alert provides sufficient information to allow for the initiation of threat escalation procedures to address the compromised electronic device. Accordingly, the detector can provide agencies, organizations and consumers with an ability to confirm that energy emitting sources, such as replacement lighting sources, are performing within their prescribed operating ranges, and if not, detect whether any of the energy emitting sources are compromised.

Figure 1A:
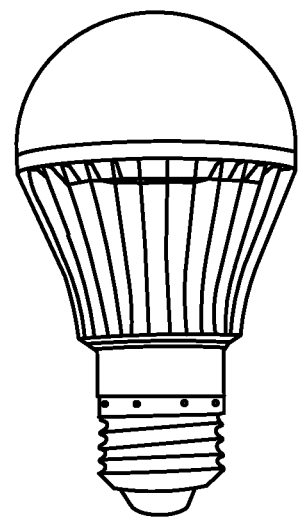
FIG. 1A-FIG. 1B illustrates an exemplary energy emitting source.
Figure 1B:
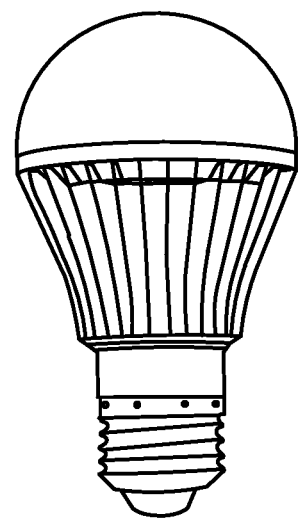
Figure 2:
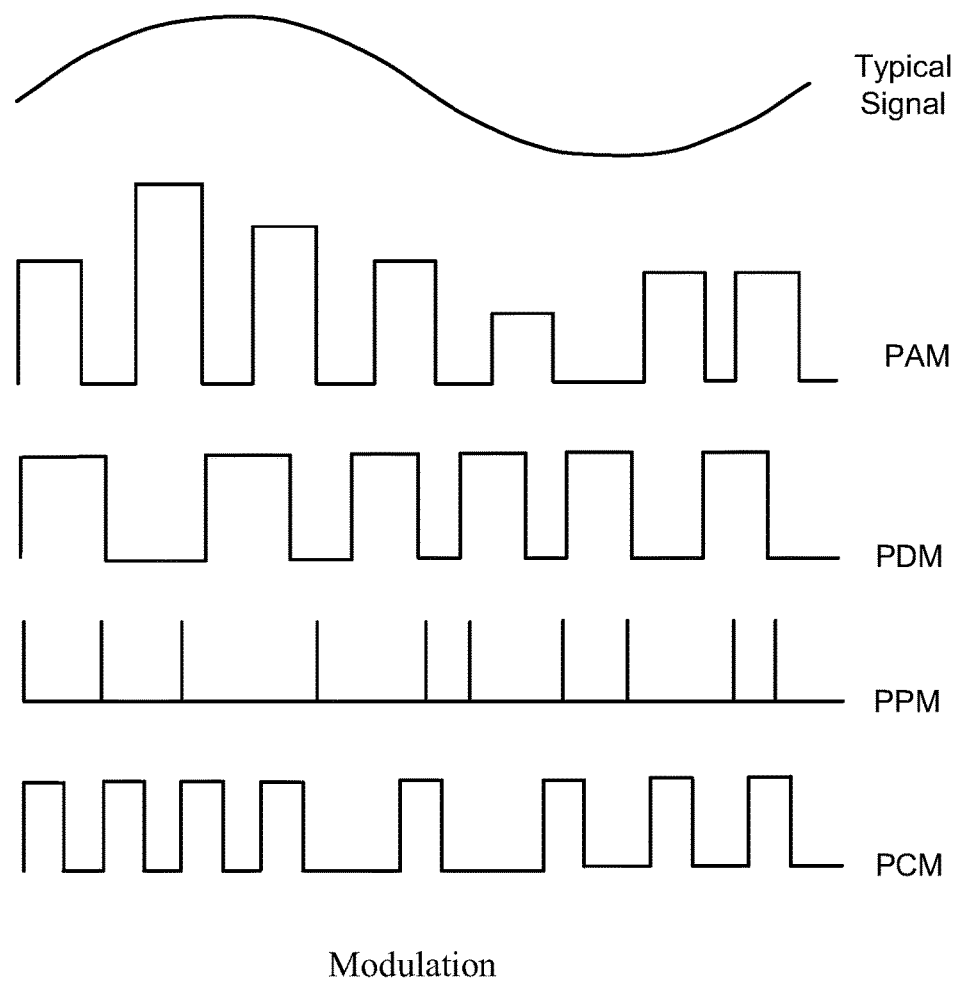
FIG. 2 shows an example modulation scheme of an energy emitting source.

As an example, FIG. 1 shows two off-the-shelf LED bulbs as energy emitting sources. The bulb shown in FIG. 1A is a normal lamp, while the other bulb shown in FIG. 1B is a lamp that has been outfitted with surreptitious electronics that allow it to transmit information. Both lamps will provide their rated luminosity when power is supplied, and the owner of these lamps will be unaware of their differences. The cavities of these lamps are not like their incandescent predecessors. These lamps are formed mostly of void space with ample room to add electronics. Methods that can be used to transmit information on such lamps are varied, but similar in that pulsed modulation prevents the energy source from flickering that would be detectable directly by the human eye. An example of various modulation schemes is shown in FIG. 2. A detector in accordance with implementations described herein can detect, and alert on, any of these modulation schemes and give the operator additional information on a user interface to provide justification for escalating evaluation on the electronics source.

Figure 3:
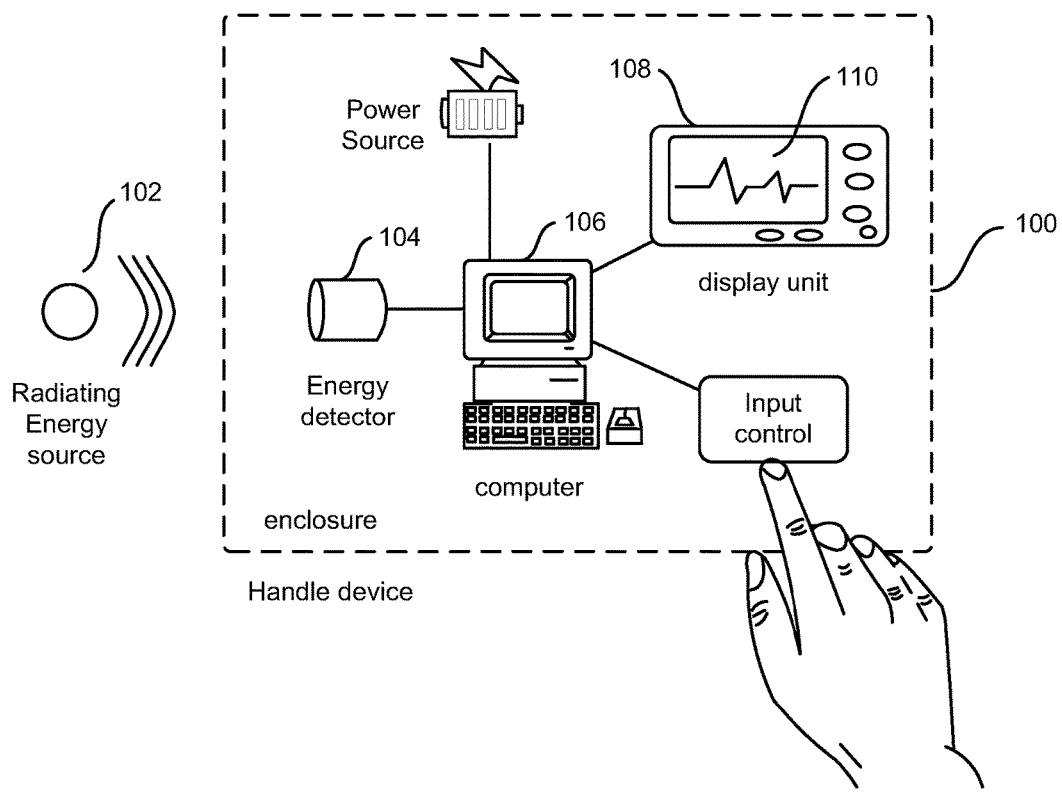
FIG. 3 is a functional block diagram of a handheld detector for detecting compromised energy emitting sources.

As illustrated in FIG. 3, a handheld detector 100 can be used to identify an energy pattern that is outside of specified performance boundaries of the energy emitting source, or otherwise detect an out-of-bounds or anomalous radiation pattern or signal from an energy emitting source 102. The handheld detector 100 includes a sensor 104 that can be directed at the energy emitting source 102 to measure a signal in a specified spectral range. The sensor 104 can be interchangeable depending on what radiation pattern or signal is sought to be detected. Alternatively, the sensor 104 can be reconfigurable in place. In some implementations, the sensor 104 is an electromagnetic sensor that is configured to be sensitive to a spectral range above and below a predetermined optical range, and the handheld detector 100 is pulsed energy that is line of sight, that is, switched off and on at high speed. In other implementations, the sensor 104 is an acoustic sensor configured to detect pulsed ultrasonic energy.

Figure 4:
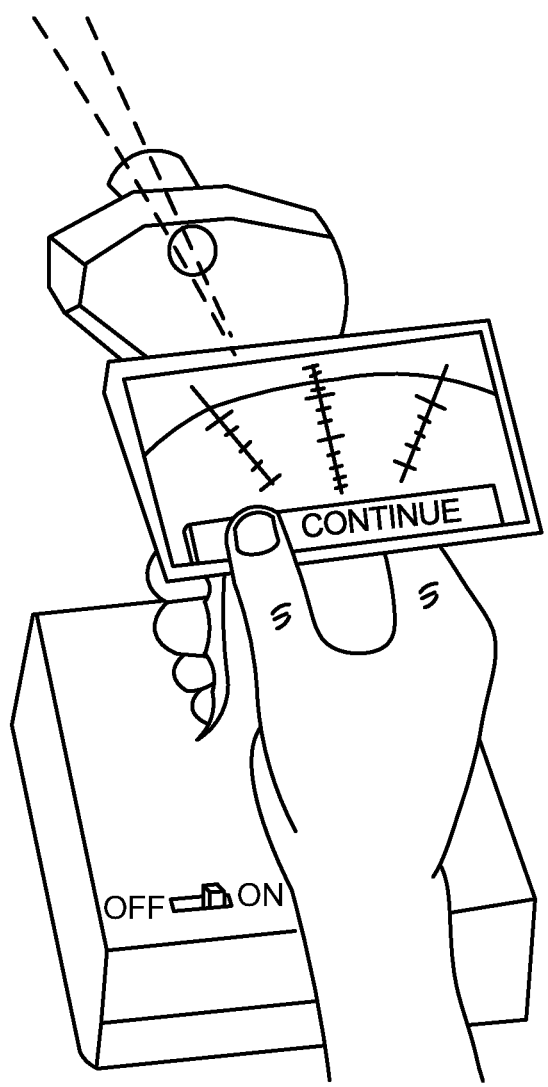
FIG. 4 shows a handheld detector in accordance with implementations described herein.
Figure 5:
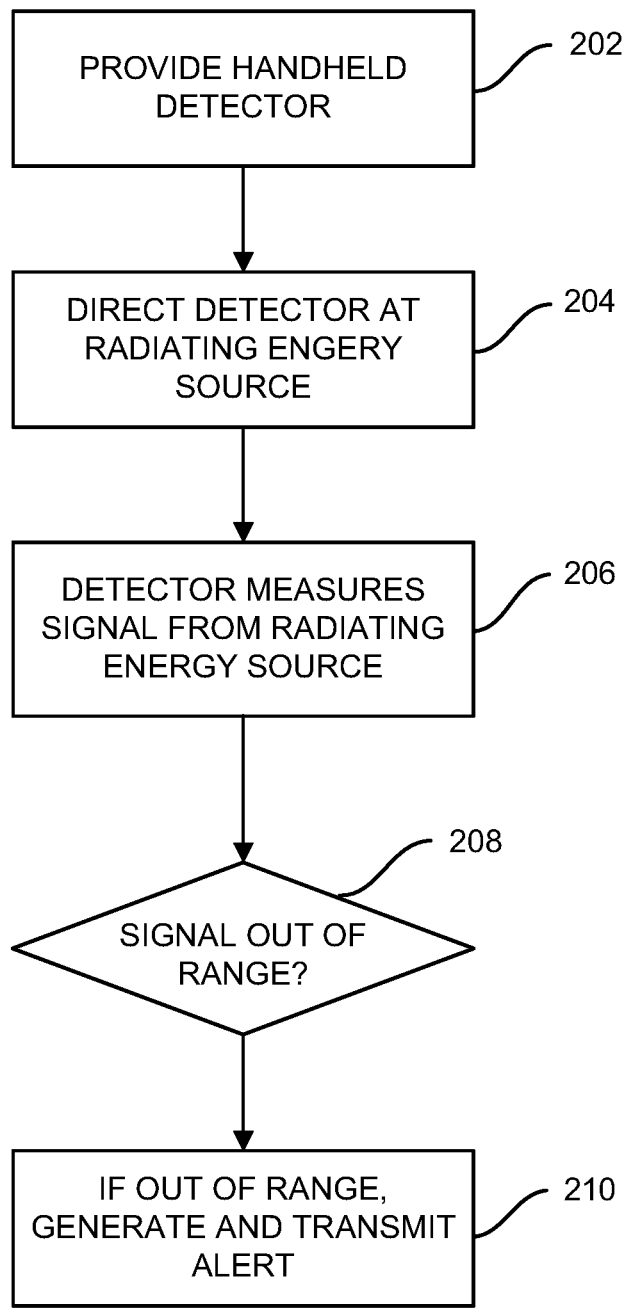
FIG. 5 is a flowchart of a method for sensing out-of-range signals from an energy emitting source.

The handheld detector 100 further includes a processing unit 106 that is programmed to interpret, calculate, scale, format and/or characterize the sensed signals from the sensor 104. The handheld detector further includes a user interface 108 that is operable under command of the processing unit to generate a display 110 to display results and provide instructions, and to receive input from a user to initiate a signal detection process to identify an energy pattern that is outside of specified performance boundaries of the energy emitting source. The handheld detector 100 can further include a handheld housing unit, as shown in FIG. 4, to contain all or most of the components described above. The handheld device 100 can further include a power source 112, such as one or more batteries for full mobile operation, or may include a power cord or power adapter, with or without the batteries, for non-mobile use.

An agency, organization or consumer can modify their security procedures to include routine searches for information leakage, covert channels, out-of-band channels or insider threats. In accordance with some implementations, a method 200 for sensing out-of-bounds signals from an energy emitting source is provided. The method 200 includes providing, at 202, a handheld detector that is configured to sense, detect, and/or measure a signal from the energy emitting source in a specified spectral range, and to indicate whether the signal is outside of specified performance boundaries of the energy emitting source, which in turn indicates whether such signal is surreptitious. An energy emitting source that is compromised is likely a low-energy light emitting diode (LED), yet other energy emitting sources can be monitored by a device as described herein.

In some implementations consistent with the subject matter described herein, the signal can be a modulation of light radiating from the energy emitting source, where the modulation is undetectable by the human eye. As illustrated in FIG. 2, the modulation can be pulse amplitude modulation (PAM), pulse density modulation (PDM), pulse position modulation (PPM), pulse code modulation (PCM), or other information-carrying modulation scheme. In yet other implementations, information in the signal may be generated by color shift keying (CSK). All such modulation schemes or other information-bearing manipulation of a light source can be undetectable by a human eye. These schemes are consistent with VLC specifications found in IEEE802.15.7.

At 204, the handheld detector is directed or aimed at the energy emitting source. At 206, the handheld detector measures the signal from the energy emitting source. At 208, a processor of the handheld detector determines whether the measured signal is out-of-bounds from the specified spectral range. For instance, the processor may discern from the energy emitting source an unusual modulation scheme from the signal, or an anomalous pattern of signals from the base or general signal. If the signal is outside its expected range, at 210 the handheld detector generates an alert. The alert can be a signal generated on a user interface and/or a display in the user interface. Alternatively, the alert can include a light, a sound, a vibration, or other type of signal to indicate an alert status.

Figure 6:
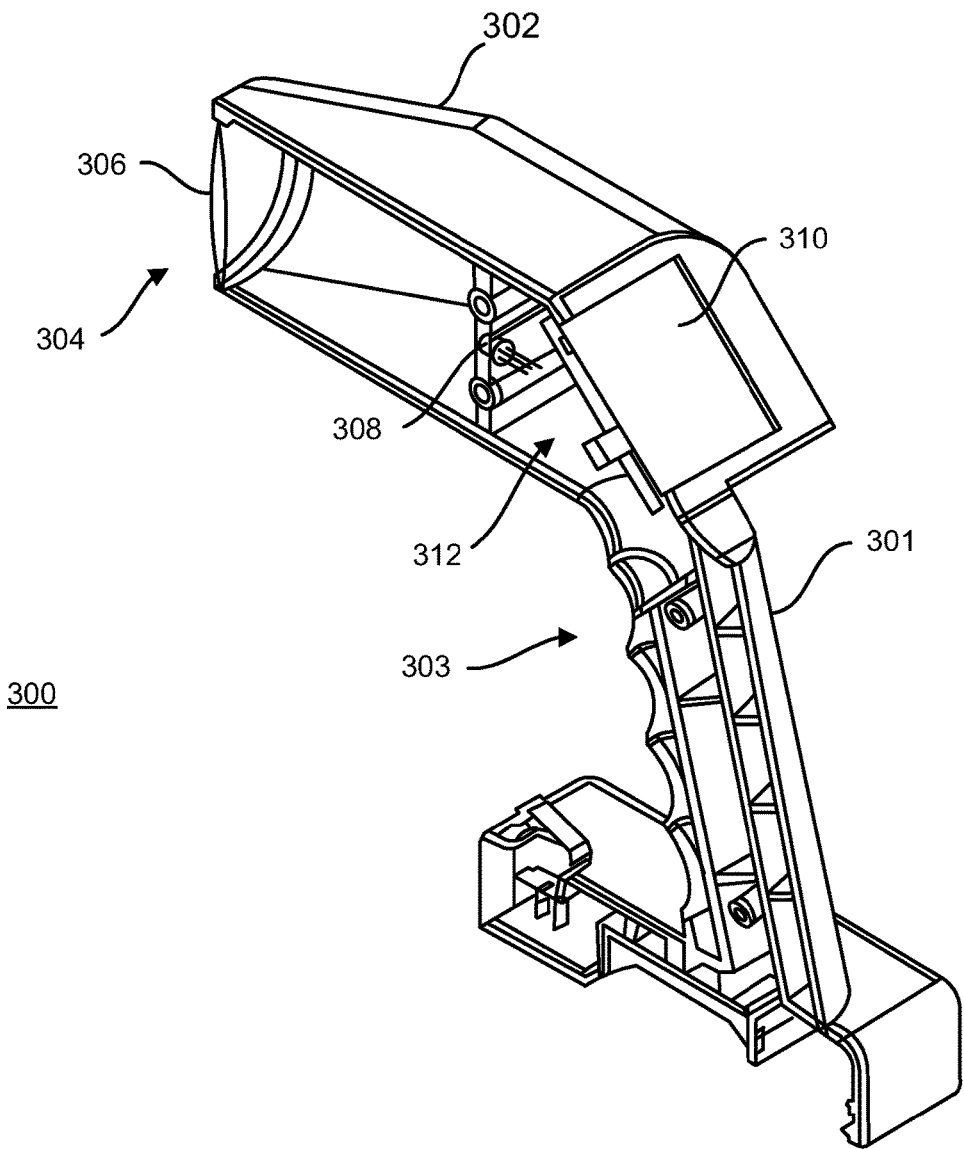
FIG. 6 is a cut-away view of a handheld detector for detecting compromised energy emitting sources.

FIG. 6 is a cut-away view of a handheld detector 300 for detecting compromised energy emitting sources. The handheld detector 300 includes a housing 301 that includes a detection chamber 302 and a hand grip portion 303. The handgrip portion 303 can also be formed as a mount to a stationary object such as a table, a tripod, or an aiming platform. The detection chamber 302 can include one or more lenses 306 to receive and focus energy received from an energy emitting source, and/or to increase signal-to-noise (SNR) levels. The handheld detector 300 further includes a sensor 308 to sense, upon activation of a signal detection process, whether or not an energy pattern from the energy emitting source is outside the specified performance boundaries of the energy emitting source. As described above, the sensor 308 can be an electromagnetic sensor or acoustic sensor to detect the presence of a modulation scheme from the energy emitting source, such as pulse amplitude modulation (PAM), pulse density modulation (PDM), pulse position modulation (PPM), pulse code modulation (PCM), or other information-carrying modulation scheme. In yet other implementations, information in the signal may be generated by color shift keying (CSK), and the sensor 308 can have color differentiation sensing capabilities.

The handheld detector 300 can further include a user interface 310. In some implementations, the user interface 310 includes an input device to receive input from a user and an output device to output information to the user. The input device and output device can be integrated, or separate. The user interface 310 provides an indication of a signal detection process that is activated based on the input to the input device. The signal detection process is configured to identify an energy pattern that is outside of specified performance boundaries of the energy emitting source, the energy pattern being undetectable by a human eye, and the information outputted by the output device includes a result of the signal detection process, as detected by the sensor 308.

The handheld detector 300 also includes a processing unit 312 connected with the sensor 308 and the user interface 310. The processing unit 312 includes logic to execute the signal detection process, and a processor (not shown) to interpret and characterize the energy pattern sensed by the sensor 308. The processing unit is further configured to generate the result of the signal detection process for being output on the output device of the user interface 310. In some implementations, the output device of the user interface 310 includes a display for displaying graphical information representing the result of the signal detection process. In other implementations, the output device includes a speaker for generating an audible sound representing the result of the signal detection process.

The handheld detector 300 can further include a power source coupled with the user interface, the sensor, and the processing unit, to provide electrical power to those components. In some implementations, the handheld detector 300 can include a targeting mechanism to aim the sensor toward the energy emitting source.

In yet other implementations, a detector can include a housing with a detection chamber, and a mounting mechanism for mounting the detector to a vehicle such as a "drone" or remotely-controllable flying vehicle. In some instances, the vehicle can be a water-going vessel, or a remotely-controllable rolling earth-bound vehicle. In such cases, the user interface of such a detector can be remote from the detection chamber and sensor, and the detector can include a wireless communication device to communicate the result of the signal detection process to the remote user interface or other device.

Accordingly, the handheld detector can be aimed sequentially at one or more energy emitting sources, and a sample taken by an operator of the handheld detector. Based on the result of the sample, the operator can move to the next energy emitting source, or if an alert is generated by the handheld device, initiate an escalation procedure prescribed by a governing organization. An organization's management will then be responsible for responding to the compromised energy source. The next response could involve confirmation by a trained expert and/or government official who can capture data and interpret waveforms with suitable analytical tools, or for handling in accordance with applicable laws.

Although a few embodiments have been described in detail above, other modifications are possible. Other embodiments may be within the scope of the following claims.

The invention claimed is:

1. An apparatus for detecting a surreptitious signal from an LED source having performance boundaries, the apparatus comprising:
    a sensor to sense, upon activation of a signal detection process by the apparatus, whether or not a modulation scheme of an energy pattern from the LED source is outside the performance boundaries of the LED source, the modulation scheme being undetectable by a human eye;
    a processing unit connected with the sensor, the processing unit having logic to interpret and characterize the energy pattern sensed by the sensor, the processing unit further configured to generate a result of the signal detection process; and
    a user interface having an input device and an output device, the input device receiving an input to activate the signal detection process, the output device being configured to generate an output according to the result of the signal detection process, the result being indicative of a presence or absence of the modulation scheme of the energy pattern.

2. The apparatus in accordance with claim 1, wherein the signal detection process is configured to identify a modulation scheme of an energy pattern that is different from the performance boundaries of the LED source.

3. The apparatus in accordance with claim 1, wherein the modulation scheme is one of a group of modulation schemes including: pulse width modulation (PWM), pulse amplitude modulation (PAM), pulse density modulation (PDM), pulse position modulation (PPM), and pulse code modulation (PCM).

4. The apparatus in accordance with claim 1, wherein the user interface, the sensor, and the processing unit are coupled with a handle for being grasped and aimed by a hand of a user.

5. The apparatus in accordance with claim 1, wherein the sensor is coupled with a handle for being grasped and aimed by a user.

6. The apparatus in accordance with claim 1, wherein the output device of the user interface includes a display for displaying graphical information representing the result of the signal detection process.

7. The apparatus in accordance with claim 1, wherein the output device of the user interface includes a speaker for generating an audible sound representing the result of the signal detection process.

8. The apparatus in accordance with claim 1, further comprising a power source coupled with the user interface, the sensor, and the processing unit, the power source providing electrical power thereto.

9. The apparatus in accordance with claim 1, further comprising a targeting mechanism to aim the light energy detecting unit of the detector toward the energy emitting source.

10. The apparatus in accordance with claim 9, wherein the targeting mechanism includes a camera that generates an image of the energy emitting source on the user interface.

11. The apparatus in accordance with claim 1, wherein the sensor is configured to perform sensing within a predefined spectrum of light and/or frequency that is associated with the specified performance boundaries of the energy emitting source.

12. An apparatus for detecting a surreptitious signal from a light emitting diode (LED) source that has specified performance boundaries, the apparatus comprising:

a handle;

a user interface coupled with the handle and having an input device to receive input from a user and an output device to output information to the user, the user interface providing an indication of a signal detection process that is activated based on the input to the input device, the signal detection process being configured to identify a modulation scheme of an energy pattern that is outside of the specified performance boundaries of the LED source, the modulation scheme being undetectable by a human eye, and the information outputted by the output device including a result of the signal detection process;

a sensor coupled with the handle to sense, upon activation of the signal detection process, whether or not the modulation scheme of the energy pattern from the LED source is outside the specified performance boundaries of the LED source; and a processing unit connected with the sensor and the user interface, the processing unit having logic to execute the signal detection process and a processor to interpret and characterize the energy pattern sensed by the sensor, the processing unit further configured to generate the result of the signal detection process for being output on the output device of the user interface, the result being indicative of either a presence or absence of the modulation scheme of the energy pattern.

13. The apparatus in accordance with claim 12, wherein the handle is configured to be held in a hand of a user.

14. The apparatus in accordance with claim 12, wherein the modulation scheme is one of a group of modulation schemes including: pulse width modulation (PWM), pulse amplitude modulation (PAM), pulse density modulation (PDM), pulse position modulation (PPM), and pulse code modulation (PCM).

15. The apparatus in accordance with claim 12, wherein the user interface, the sensor, and the processing unit are coupled with the handle.

16. The apparatus in accordance with claim 12, wherein the output device of the user interface includes a display for displaying graphical information representing the result of the signal detection process.

17. The apparatus in accordance with claim 12, wherein the output device of the user interface includes a speaker for generating an audible sound representing the result of the signal detection process.

18. The apparatus in accordance with claim 12, further comprising a power source coupled with the user interface, the sensor, and the processing unit, the power source providing electrical power thereto.

19. The apparatus in accordance with claim 12, further comprising a targeting mechanism to aim the light energy detecting unit of the detector toward the energy emitting source.

20. The apparatus in accordance with claim 12, wherein the sensor is configured to perform sensing within a predefined spectrum of light and/or frequency that is associated with the specified performance boundaries of the energy emitting source.

* * * * *